(12) United States Patent
Binzer et al.

(10) Patent No.: US 9,768,517 B2
(45) Date of Patent: Sep. 19, 2017

(54) RADAR SENSOR

(71) Applicant: ROBERT BOSCH GMBH, Stuttgart (DE)

(72) Inventors: Thomas Binzer, Ingersheim (DE); Raphael Hellinger, Pforzheim (DE); Juan Pontes, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 214 days.

(21) Appl. No.: 14/381,181

(22) PCT Filed: Jan. 23, 2013

(86) PCT No.: PCT/EP2013/051173
§ 371 (c)(1),
(2) Date: Aug. 26, 2014

(87) PCT Pub. No.: WO2013/127567
PCT Pub. Date: Sep. 6, 2013

(65) Prior Publication Data
US 2015/0022389 A1 Jan. 22, 2015

(30) Foreign Application Priority Data
Feb. 27, 2012 (DE) .................. 10 2012 202 913

(51) Int. Cl.
*H01Q 17/00* (2006.01)
*G01S 13/93* (2006.01)
(Continued)

(52) U.S. Cl.
CPC ............ *H01Q 17/008* (2013.01); *G01S 7/02* (2013.01); *G01S 13/02* (2013.01); *G01S 13/931* (2013.01);
(Continued)

(58) Field of Classification Search
CPC .. G01S 13/931; G01S 2013/9314–2013/9396; G01S 13/02;
(Continued)

(56) References Cited

U.S. PATENT DOCUMENTS 3,631,503 A * 12/1971 Tang ................. H01Q 17/001
342/371
3,911,433 A * 10/1975 Redman ................. G01S 7/40
342/165

(Continued)

FOREIGN PATENT DOCUMENTS

CN 1189705 A 8/1995
CN 101313200 A 11/2008
(Continued)

OTHER PUBLICATIONS

International Search Report for PCT/EP2013/051173, dated May 3, 2013.

*Primary Examiner* — Matthew M Barker
(74) *Attorney, Agent, or Firm* — Norton Rose Fulbright US LLP; Gerard Messina

(57) ABSTRACT

A radar sensor includes: a radar antenna, a radar lens and a funnel element between the radar antenna and the radar lens. The funnel element includes a material which absorbs the radar radiation emitted by the radar antenna.

22 Claims, 2 Drawing Sheets

(51) Int. Cl.
*H01Q 1/32* (2006.01)
*H01Q 19/06* (2006.01)
*G01S 7/02* (2006.01)
*G01S 13/02* (2006.01)

(52) U.S. Cl.
CPC ........... *H01Q 1/3233* (2013.01); *H01Q 17/00* (2013.01); *H01Q 19/06* (2013.01); *G01S 2007/027* (2013.01); *G01S 2013/9321* (2013.01); *G01S 2013/9325* (2013.01)

(58) Field of Classification Search
CPC ..... G01S 7/02; G01S 2007/027; H01Q 17/00; H01Q 17/008; H01Q 1/3233; H01Q 19/06
See application file for complete search history.

(56) References Cited

U.S. PATENT DOCUMENTS

| | | | |
|---|---|---|---|
| 3,944,948 A * | 3/1976 | Redman | G02F 2/002 359/285 |
| 3,962,657 A | 6/1976 | Redman et al. | |
| 4,410,892 A * | 10/1983 | Knop | H01Q 19/132 343/781 R |
| 4,788,553 A * | 11/1988 | Phillips | H01Q 19/08 343/753 |
| 5,162,806 A * | 11/1992 | Monser | H01Q 9/27 343/753 |
| 5,317,328 A * | 5/1994 | Allen | H01Q 19/132 343/781 R |
| 5,991,474 A * | 11/1999 | Baldi | G01S 7/032 342/153 |
| 6,023,246 A * | 2/2000 | Tanabe | H01Q 19/08 343/753 |
| 6,028,560 A * | 2/2000 | Pfizenmaier | G01S 13/931 343/753 |
| 6,037,894 A * | 3/2000 | Pfizenmaier | G01S 7/032 342/128 |
| 6,075,492 A * | 6/2000 | Schmidt | H01Q 1/3233 343/753 |
| 6,322,275 B1 * | 11/2001 | Schmidt | B60R 19/483 403/14 |
| 6,611,238 B1 | 8/2003 | Santoru et al. | |
| 6,674,412 B1 * | 1/2004 | Schmidt | H01Q 1/42 342/70 |
| 7,151,479 B2 * | 12/2006 | Beez | G01S 7/4026 342/117 |
| 7,898,480 B2 * | 3/2011 | Ebling | G01S 13/931 343/700 MS |
| 8,319,605 B2 * | 11/2012 | Hassan | G01C 17/38 340/10.2 |
| 8,432,309 B2 * | 4/2013 | MacDonald | G01S 13/931 342/123 |
| 2003/0208312 A1 * | 11/2003 | Winter | G01S 13/931 701/96 |
| 2003/0214457 A1 * | 11/2003 | Ishikawa | G01S 7/032 343/909 |
| 2006/0290518 A1 * | 12/2006 | Bingle | B60Q 3/06 340/573.1 |
| 2012/0119969 A1 * | 5/2012 | MacDonald | H01L 23/552 343/841 |
| 2014/0285373 A1 * | 9/2014 | Kuwahara | G01S 13/931 342/27 |

FOREIGN PATENT DOCUMENTS

| | | | |
|---|---|---|---|
| DE | 4412770 A1 * | 10/1995 | ............ G01S 7/032 |
| EP | 0 000 305 | 1/1979 | |
| EP | 0 871 241 | 10/1998 | |
| GB | 2313486 A * | 11/1997 | ............ G01S 7/032 |

* cited by examiner

RADAR SENSOR

BACKGROUND OF THE INVENTION

1. Field of the Invention

The present invention relates to a radar sensor, e.g., a radar sensor for distance measurement in a motor vehicle.

2. Description of the Related Art

In a motor vehicle, a radar sensor may be used for determining a distance to a surrounding object. Based on the determined distance, different comfort and convenience functions of the motor vehicle may be controlled. For example, a speed of the motor vehicle may be automatically controlled to a predetermined value, a forward distance measurement with the aid of the radar sensor ensuring that the vehicle maintains a predetermined safety distance to a preceding motor vehicle. Other applications of a radar sensor include an emergency brake function when rapidly approaching an object, a distance warning device for making it easier for a driver of the motor vehicle to maintain a safety distance to a preceding vehicle, or a parking assistant for collision warning in close range at a low driving speed.

Such radar sensors are generally designed as an integrated module, the module providing already evaluated or partially evaluated distance or proximity signals to an electrical interface. All components, which are necessary for transmitting, receiving and correlating radar signals, are included in the module.

Such a radar sensor generally includes a radar antenna, a high-frequency circuit for activating the radar antenna and a radar lens for focusing the radar radiation emitted by the radar antenna or radar radiation incident on it. To prevent high-frequency radiation of the radar antenna from adversely affecting the high-frequency circuit or high-frequency radiation of the high-frequency circuit from adversely affecting the function of the radar antenna, it is known to provide a metal plate or a metal cage, which includes a recess, through which the radar antenna transmits or receives radar radiation, to shield the radar antenna from the high-frequency circuit. This makes it possible to shield electromagnetic radiation and in particular the high-frequency radar radiation, so that the high-frequency circuit and the radar antenna do not mutually influence one another; however, this may also adversely affect the performance or characteristics of the radar antenna.

The object of the present invention is to suppress stray radiation in the area of a radar antenna of a radar sensor.

BRIEF SUMMARY OF THE INVENTION

A radar sensor according to the present invention includes a radar antenna, a radar lens and a funnel element between the radar antenna and the radar lens. The funnel element includes a material which absorbs the radar radiation emitted by the radar antenna.

This makes it possible to omit the use of a shielding metal surface which may reflect radar radiation and other electromagnetic radiation. A directional characteristic of the radar antenna may be immune to influence due to the absorbing material. This may result in improved operation of the radar sensor. Furthermore, it may be simpler to adapt the geometry of the radar sensor, in particular of the radar lens, to an emission characteristic of the radar antenna. This makes it possible to improve the control of the emission characteristic of the radar sensor and achieve savings in development and production costs.

The funnel element's narrow side faces the radar antenna and its wide side faces the radar lens. In one preferred specific embodiment, the funnel element is in contact with the radar lens. This makes it possible to ensure that the radar radiation transmitted by the radar antenna is incident on a geometrical area of the radar lens, which is designed for focusing the radar radiation. This may reduce a distortion of the radar radiation, in particular in a radially outer edge area of the radar lens.

A lens edge, which in particular does not contribute to the focusing of the radar radiation, may lie in the radially outer area of the radar lens, the funnel element being designed for shielding the lens edge from radar radiation of the radar antenna by absorption. The lens edge may be essential for structural reasons. In particular, the lens edge may be used for connecting the radar lens to a housing in order to encapsulate the radar sensor against environmental influences. The essential mechanical structure of a known radar sensor may thus be retained without distorting the radar radiation in the area of the lens edge.

In one specific embodiment, the funnel element includes a cylindrical section in the area of the radar lens. The cylindrical section may contribute to better shielding the lens edge from radar radiation from the radar antenna.

In another specific embodiment, the funnel element has a radially inward facing collar in the area of the radar antenna. The collar may contribute to improved suppression of radial electromagnetic radiation with respect to a main propagation direction of the radar radiation. In particular, when the radar antenna is mounted on a planar component such as a printed circuit board, the collar may suppress surface waves propagating along the surface of the component. Furthermore, the collar may be used for a mechanical connection of the radar lens to the radar antenna or to a planar element on which the radar antenna is mounted or formed. A contact force of the funnel element may be distributed by the collar to a larger area. A mechanical structure of a module-like encapsulated radar sensor may thus be made simpler or improved.

The radar antenna may be situated together with other high-frequency components on a planar circuit substrate, in particular a printed circuit board. This makes it possible to integrate the radar antenna and the electronic high-frequency components on the circuit substrate, which may reduce the space requirements, weight and manufacturing costs of the radar sensor. The funnel element may nonetheless effectively suppress a mutual influencing of the radar antenna and the high-frequency components.

The funnel element may have a fastening element for attaching it to the radar antenna, so that the radar lens including the funnel element forms a separately manageable unit. This may simplify an assembly of the radar sensor.

The funnel element may be manufactured from a radar radiation absorbing plastic material. For this purpose, the plastic material may have predetermined dielectric properties, and resistive and/or magnetic substances may be added to the plastic material for converting radar radiation into heat. This makes it possible to achieve efficient absorption of the radar radiation.

In one specific embodiment, the material of the funnel element is porous. Reflection and refraction of the radar radiation on pore boundaries may contribute to increasing the absorption capacity of the funnel element.

DETAILED DESCRIPTION OF THE INVENTION

Figure 1:
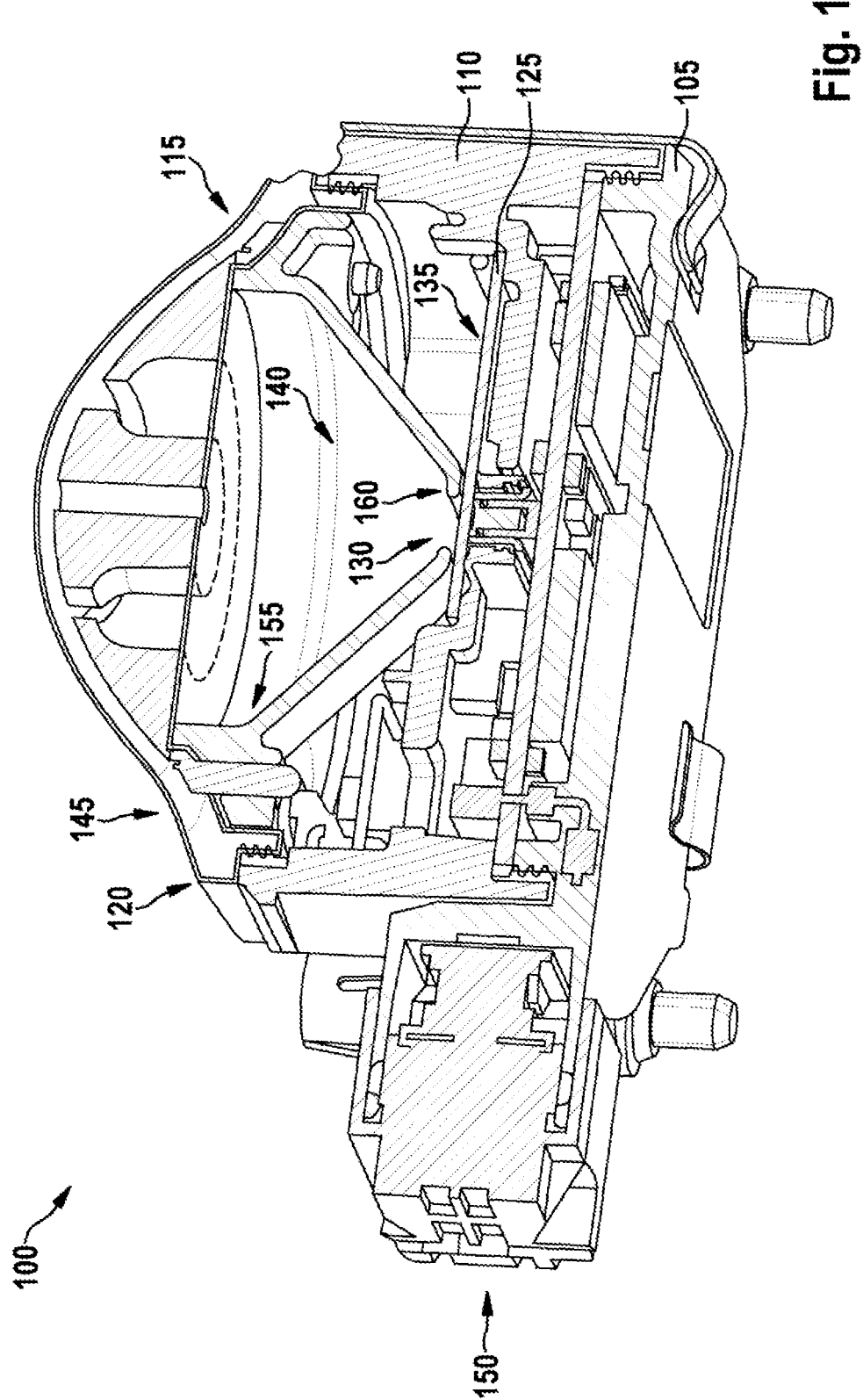
FIG. 1 shows a radar sensor.

FIG. 1 shows a radar sensor 100. Radar sensor 100 is in particular designed for use in a motor vehicle. Radar sensor 100 is preferably a long-range radar sensor (LRR) for determining a distance and if necessary a speed of an object at a distance of up to several hundreds of meters. The radar radiation emitted by radar sensor 100 is preferably in the range of approximately 24 GHz or 77 GHz.

Radar sensor 100 includes a base plate 105 and a radar lens 115, which close a housing 110 at diametrically opposed ends. In other specific embodiments, the components of radar sensor 100 may also be protected from environmental influences in some other way than by housing 110 and base plate 105. Radar lens 115 has a radially outer lens edge 120, which may be attached to housing 110. Furthermore, the radar sensor includes a circuit substrate or a printed circuit board 125, on which a radar antenna 130 and a high-frequency circuit 135 are situated. Radar antenna 130 may be formed on printed circuit board 125 in the form of a printed circuit. Between printed circuit board 125 and radar lens 115 extends a funnel element 140, the narrow side of which faces radar antenna 130 and its wide side faces radar lens 115. In the area of radar lens 115, a fastening element 145 is formed on funnel element 140 for attaching it to radar lens 115.

An interface 150 is optionally attached to base plate 105 in order to provide electrical signals with regard to a measuring result of radar sensor 100 to the outside and for connecting to a power supply. Interface 150 may be connected to other electronic components in radar sensor 100, which will not be discussed in greater detail in the present case.

High-frequency circuit 135 on printed circuit board 125 preferably maintains a predetermined radial distance to radar antenna 130 to make it possible to place funnel element 140 on printed circuit board 125 in this area. The narrow side of funnel element 140 lies in the area of radar antenna 130 and is preferably engaged with printed circuit board 125. The wide side of funnel element 140 lies in the area of radar lens 115, and is preferably axially in contact with radar lens 115, so that funnel element 140 is fixed in the axial direction between radar lens 115 and printed circuit board 125.

The side of radar lens 115 facing funnel element 140 is preferably planar. An internal width of funnel element 140 on radar lens 115 is preferably sized in such a way that an area of radar lens 115 lying radially within lens edge 120, which is relevant for the focusing of exiting or entering radar radiation, is adjacent to the cavity formed by funnel element 140.

Preferably, a cylindrical section 155 is formed on funnel element 140 in the area of radar lens 115. Cylindrical section 155 may make it more difficult for radar radiation emitted from radar antenna 130 from reaching lens edge 120 where difficult to control reflections and a distortion of radar radiation may occur.

On its narrow side facing radar antenna 130, funnel element 140 preferably has a radially inward extending collar 160. This makes it possible to enlarge a contact surface of funnel element 140 on printed circuit board 125. As a result, surface waves between radar antenna 130 and high-frequency circuit 135 may be effectively damped.

In the area of cylindrical section 155, a fastening element 145 may be formed on funnel element 140 in order to attach funnel element 140 to radar lens 115. This may result in a separately manageable unit, which makes assembly of radar sensor 100 easier. In the present specific embodiment, for example, printed circuit board 125 may be positioned in housing 110 before radar lens 115, together with funnel element 140, is placed on housing 110 from above, resulting in housing 110 being closed axially on the top, and printed circuit board 125 is optionally pressed axially onto a supporting structure of housing 110. Before or after the assembly of radar lens 115 and funnel element 140, base plate 105 may be attached on the underside of housing 110.

Funnel element 140 is made of a material whose properties and structure are conducive to absorption of radar radiation. Both the material and the structure are preferably optimized to a wavelength of radar radiation which is emitted upwards during normal operation by radar antenna 130 in FIG. 1.

Funnel element 140 is primarily designed for keeping the radiation emitted by radar antenna 130 away from elements, which either may be impaired by radar radiation, in particular high-frequency circuit 135, or which, due to their refractive properties, may interfere with a measurement with the aid of the radar radiation, such as lens edge 120. Secondly, funnel element 140 is also designed for keeping high-frequency radiation which has neither been generated by radar antenna 130, nor has entered into radar sensor 100 through radar lens 115, away from radar antenna 130. Such radiation may, for example, be generated in the form of a fundamental or harmonic wave frequency by high-frequency circuit 135.

Figure 2:
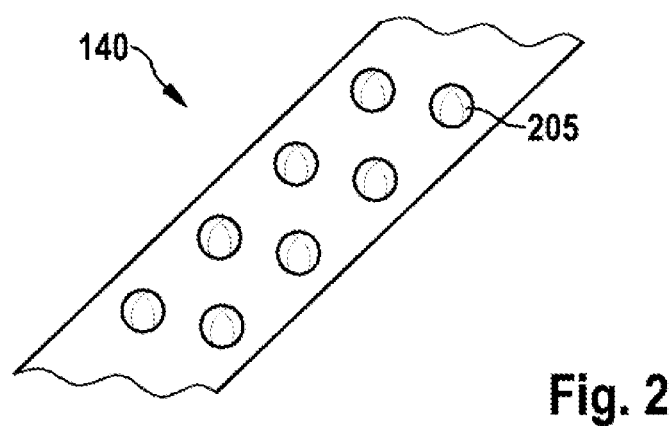
FIG. 2 shows a section through a material of the funnel element of FIG. 1.

FIG. 2 shows a section through a material of funnel element 140 of FIG. 1. Funnel element 140 is preferably manufactured from a plastic material. The plastic material of funnel element 140 preferably has semi-conductive properties, i.e., its conductivity lies between that of a conductor and an insulator, in particular in the range between $10^3$ and $10^{-8}$ S/cm. This makes it possible for a part of radar radiation, to which funnel element 140 is exposed, to be converted into heat within the material, as a result of which the radar radiation is effectively absorbed.

In the preferred specific embodiment shown in FIG. 2, the material of funnel element 140 is furthermore interspersed with metalized beads or metal balls 205 of a predetermined diameter, which may be selected in particular as a function of a wavelength of the radar radiation. In a known manner, metal balls 205 may improve the absorption properties of funnel element 140. In one variant of the shown specific embodiment, metal balls 205 may also be applied to an inner or outer surface of funnel element 105, for example, with the aid of an appropriate paint coating.

Figure 3:
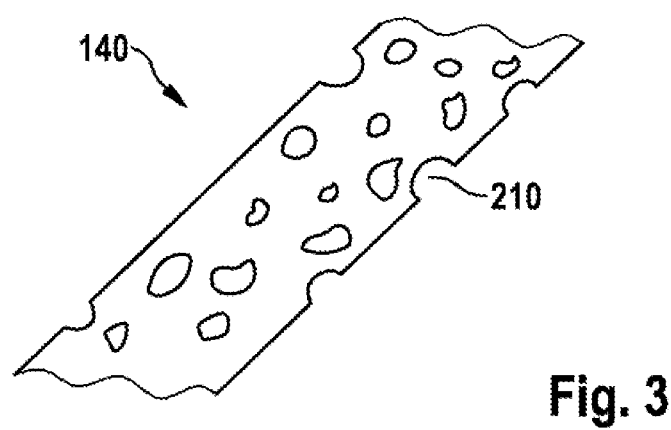
FIG. 3 shows a section through an alternative material similar to FIG. 2.

FIG. 3 shows a section through an alternative material of funnel element 140 similar to the diagram of FIG. 2. The shown specific embodiment may be combined with the specific embodiment of FIG. 2. The material of funnel element 140 is interspersed with pores 210, whose size range is preferably adapted to a wavelength of the radar radiation emitted by radar antenna 130. If radar radiation penetrates the material of funnel element 140, it is partially reflected on boundaries of pores 210, as a result of which interference effects may form, which increase the absorption of the radar radiation.

What is claimed is:

1. A radar sensor, comprising:
   a radar antenna;
   a radar lens;
   a funnel element located between the radar antenna and the radar lens, wherein the funnel element includes a material which absorbs radar radiation emitted by the radar antenna;
   a housing; and
   a base plate, wherein the base plate and the radar lens close the housing at diametrically opposed ends.

2. The radar sensor as recited in claim 1, wherein the funnel element is in contact with the radar lens.

3. The radar sensor as recited in claim 2, wherein a radially outer lens edge of the radar lens does not contribute to focusing, and wherein the funnel element shields the radially outer lens edge from radar radiation of the radar antenna by absorption.

4. The radar sensor as recited in claim 3, wherein the funnel element has a cylindrical section in the area of the radar lens.

5. The radar sensor as recited in claim 3, wherein the funnel element has a radially inward facing collar in the area of the radar antenna.

6. The radar sensor as recited in claim 3, wherein the radar antenna is situated together with high-frequency components on a planar circuit substrate, and wherein the high frequency components operate in the GHz range of about 24 GHz to about 77 GHz.

7. The radar sensor as recited in claim 3, wherein the funnel element is made of a radar radiation absorbing plastic material.

8. The radar sensor as recited in claim 7, wherein the material of the funnel element is porous.

9. The radar sensor as recited in claim 3, wherein a printed circuit board is positioned in a housing before the radar lens, together with the funnel element, and is placed on a housing from above, resulting in the housing being closed axially on the top.

10. The radar sensor as recited in claim 9, wherein before or after assembly of the radar lens and the funnel element, the base plate is attached on an underside of the housing.

11. The radar sensor as recited in claim 1, wherein the radar lens has a radial outer lens edge, which is attachable to the housing.

12. The radar sensor as recited in claim 11, wherein the radar sensor includes a printed circuit board, on which the radar antenna and a high-frequency circuit are situated, wherein the radar antenna is formed on the printed circuit board as a printed circuit.

13. The radar sensor as recited in claim 12, wherein the funnel element extends between the printed circuit board and the radar lens, a narrow side of the funnel element faces the radar antenna and a wide side of the funnel element faces the radar lens.

14. The radar sensor as recited in claim 13, wherein an interface is attached to the base plate to output electrical signals for a measuring result of the radar sensor and for connecting to a power supply.

15. The radar sensor as recited in claim 13, wherein the high-frequency circuit on the printed circuit board maintains a predetermined radial distance to the radar antenna to allow placement of the funnel element on the printed circuit board.

16. The radar sensor as recited in claim 15, wherein the narrow side of the funnel element lies in an area of the radar antenna and is engaged with the printed circuit board, and wherein the wide side of the funnel element lies in an area of the radar lens, and is axially in contact with the radar lens, so that the funnel element is fixed in an axial direction between the radar lens and the printed circuit board.

17. The radar sensor as recited in claim 16, wherein the side of the radar lens facing the funnel element is planar, wherein an internal width of the funnel element on the radar lens is sized so that an area of the radar lens lying radially within the lens edge, which is for focusing exiting or entering radar radiation, is adjacent to a cavity formed by the funnel element.

18. The radar sensor as recited in claim 17, wherein a cylindrical section is formed on the funnel element in the area of the radar lens, and wherein the cylindrical section makes it more difficult for radar radiation emitted from the radar antenna from reaching the lens edge where a reflection or a distortion of the radar radiation may occur.

19. The radar sensor as recited in claim 17, wherein on the narrow side of the funnel element facing the radar antenna, the funnel element has a radially inward extending collar to enlarge a contact surface of the funnel element on the printed circuit board, and wherein as a result, surface waves between the radar antenna and the high-frequency circuit are damped.

20. The radar sensor as recited in claim 13, wherein the funnel element is made from a plastic material, which has semi-conductive properties, in a range between $10^3$ S/cm and $10^{-8}$ S/cm, so that at least a part of the radar radiation, to which the funnel element is exposed, is converted into heat within the material, so that the radar radiation is absorbable.

21. The radar sensor as recited in claim 20, wherein the material of funnel element is interspersed with metalized beads or metal balls of a predetermined diameter, which are selected as a function of a wavelength of the radar radiation.

22. The radar sensor as recited in claim 13, wherein a material of the funnel element is interspersed with pores, whose size range is adapted to a wavelength of the radar radiation emitted by the radar antenna, so that if radar radiation penetrates the material of the funnel element, it is partially reflected on boundaries of the pores, so as to increase absorption of the radar radiation.

* * * * *